United States Patent
Park et al.

(10) Patent No.: US 8,293,392 B2
(45) Date of Patent: Oct. 23, 2012

(54) BATTERY HOLDER FOR A BATTERY ARRAY, AND BATTERY ARRAY

(75) Inventors: JunYoung Park, Plano, TX (US); Ken Miyagi, Denton, TX (US)

(73) Assignee: Sanyo Energy (USA) Corporation, Frisco, TX (US)

( * ) Notice: Subject to any disclaimer, the term of this patent is extended or adjusted under 35 U.S.C. 154(b) by 872 days.

(21) Appl. No.: 12/382,913

(22) Filed: Mar. 26, 2009

(65) Prior Publication Data

US 2010/0247994 A1 Sep. 30, 2010

(51) Int. Cl.
*H01M 2/10* (2006.01)
(52) U.S. Cl. .......................... 429/99; 429/100; 429/123
(58) Field of Classification Search ............... 429/99, 429/100, 123
See application file for complete search history.

(56) References Cited

U.S. PATENT DOCUMENTS

| | | | | |
|---|---|---|---|---|
| 3,181,974 A | * | 5/1965 | La Barben | 429/100 |
| 4,510,215 A | * | 4/1985 | Adam | 429/99 |
| 6,733,919 B1 | * | 5/2004 | Nguyen et al. | 429/99 |
| 7,951,483 B2 | * | 5/2011 | Onuki et al. | 429/163 |
| 7,968,222 B2 | * | 6/2011 | Kang et al. | 429/99 |
| 2003/0003350 A1 | * | 1/2003 | Heimer et al. | 429/99 |
| 2007/0264562 A1 | * | 11/2007 | Kang et al. | 429/96 |
| 2009/0148754 A1 | * | 6/2009 | Marchio et al. | 429/83 |

FOREIGN PATENT DOCUMENTS

JP 2002-141114 5/2002

* cited by examiner

*Primary Examiner* — Keith Walker
(74) *Attorney, Agent, or Firm* — Wenderoth, Lind & Ponack, LLP

(57) ABSTRACT

A battery holder having plates disposed between parallel oriented batteries, and holds batteries in specified positions. The battery holder is provided with L-shaped holders each having the form of a first plate and a second plate connected at a right angle corner and having an L-shaped lateral cross-section, and flat-plate holders that connect with the L-shaped holders and have an overall planar form. The L-shaped holder has connecting holes on the outside of the corner between the first plate and second plate. Further, the outer edge of the first plate opposite the corner is provided with first connecting tabs that can connect with connecting holes of another L-shaped holder. The flat-plate holder is provided with second connecting tabs on at least one side edge that connect with connecting holes of an L-shaped holder.

20 Claims, 18 Drawing Sheets

BATTERY HOLDER FOR A BATTERY ARRAY, AND BATTERY ARRAY

BACKGROUND OF THE INVENTION

1. Field of the Invention

The present invention relates to a battery holder provided with plates disposed between batteries wherein a plurality of batteries are arranged in parallel orientation, and to a battery array equipped with a battery holder.

2. Description of the Related Art

A battery array provided with a battery holder to hold and insulate a plurality of batteries in specified positions has been developed (Japanese Patent Application Disclosure 2002-141114). As shown in FIG. 1, the battery array has three battery holder 202 levels, which are the upper, intermediary, and lower levels, stacked to hold a plurality of batteries 201 in parallel orientation between each battery holder 202 level. In this battery holder, the number of battery 201 levels in the stack can be controlled by changing the number of intermediary battery holder 202 levels.

However, in a battery holder of this structure, the number of batteries disposed in a single horizontal plane is fixed. Therefore, if a different number of batteries are to be held in a single horizontal plane, it is necessary to manufacture a special-purpose battery holder. Consequently, this battery holder has the drawback that effort and expense are required to manufacture a battery array having a different number of batteries.

SUMMARY OF THE INVENTION

The present invention was developed to resolve the drawback described above. Thus, it is a primary object of the present invention to provide a battery holder for a battery array, and a battery array with an extremely simple structure that can change without restraint both the number of rows and columns of batteries held.

The battery holder of the present invention holds batteries in specified positions by disposing plates between parallel oriented batteries. The battery holder is provided with L-shaped holders each having the form of a first plate and a second plate connected at a right angle corner and having an L-shaped lateral cross-section, and flat-plate holders that connect with the L-shaped holders and have an overall planar form. An L-shaped holder has connecting holes on the outside of the corner between the first plate and second plate. Further, the outer edge of the first plate opposite the corner with the second plate is provided with first connecting tabs that can connect with connecting holes of another L-shaped holder. A flat-plate holder is provided with second connecting tabs on at least one side edge that connect with connecting holes of an L-shaped holder.

The battery holder described above has the characteristic that while it has an extremely simple structure, the number of rows and columns of batteries held can be changed without restraint. This is because connection combinations of L-shaped holders and flat-plate holders can be changed to change without restraint the number of rows and columns of batteries held.

In the battery holder of the present invention, second connecting tabs provided on flat-plate holders can be inserted into L-shaped holder connecting holes to connect a plurality of plates in a mutually orthogonal and parallel arrangement, and batteries can be disposed between those plates. This type of battery holder is shown, for example, in FIGS. 4 and 5. Connecting tabs 20 of two flat-plate holders 4 connect with connecting holes 10 in the first plate 5 and the second plate 6 of an L-shaped holder 3 to dispose four plates in a cross-shape. Four batteries 1 can be arranged in specified positions with plates disposed between the four batteries 1.

In the battery holder of the present invention, first connecting tabs provided on L-shaped holders can be inserted into connecting holes in other L-shaped holders to connect a plurality of plates in a mutually orthogonal and parallel arrangement, and batteries can be disposed between those plates. This type of battery holder is shown in FIGS. 6, 7, and 10-15. L-shaped holders 3 and flat-plate holders 4 are connected allowing 3, 4, and 6 batteries 1 to be arranged in specified positions with plates disposed between the batteries 1.

In the battery holder of the present invention, an L-shaped holder can have retaining ribs established along the same first plate edge that is provided with first connecting tabs. Retaining ribs can be formed as a single piece with the holder to retain a connected plate at a right angle. In this battery holder, a plate of one L-shaped holder is connected to the plate of another L-shaped holder at a right angle via retaining ribs, and batteries can be disposed in specified positions via the mutually orthogonal plates.

In the battery holder of the present invention, a flat-plate holder can have retaining ribs established along the same edge that is provided with second connecting tabs. Retaining ribs can be formed as a single piece with the holder to retain a connected plate at a right angle. In this battery holder, a flat-plate holder is connected to an L-shaped holder at a right angle via retaining ribs, and batteries can be disposed in specified positions via the mutually orthogonal plates.

In the battery holder of the present invention, a holder plate can have a width and length suitable for holding a circular cylindrical battery. In this battery holder, batteries, which are circular cylindrical batteries, can be disposed in specified positions via the holder plates.

In the battery holder of the present invention, first connecting tabs provided on L-shaped holders can be inserted into connecting holes in other L-shaped holders to connect a plurality of L-shaped holders in a row or column. Multiple holder plates in a row or column can be arranged with holder plates between batteries. This type of battery holder is shown in FIGS. 6, 7, 10, and 11. L-shaped holders 3 and flat-plate holders 4 are connected to dispose holder plates between 3 and 6 batteries 1 and allow multiple batteries 1 to be arranged in specified positions in a row.

In the battery holder of the present invention, second connecting tabs on flat-plate holders can be inserted into connecting holes provided in L-shaped holders to connect L-shaped holders and flat-plate holders to establish a multiple row and column array with holder plates disposed between batteries. This type of battery holder 2 is shown in FIGS. 12-15. L-shaped holders 3 and flat-plate holders 4 are connected to dispose holder plates between 4 and 6 batteries 1 and allow multiple batteries 1 to be arranged in specified positions in multiple rows and columns.

In the battery holder of the present invention, first connecting tabs provided on L-shaped holders can be inserted into connecting holes provided in the second plates of other L-shaped holders to connect a plurality of L-shaped holders in a row. Further, first connecting tabs provided on L-shaped holders can be inserted into connecting holes provided in the first plates of other L-shaped holders to connect a row of L-shaped holders into a plurality of rows. Still further, second connecting tabs provided on flat-plate holders can be inserted into connecting holes provided in L-shaped holders to connect flat-plate holders in the same plane as an L-shaped holder plate and establish a plurality of plates in a multiple row and column array with holder plates disposed between batteries.

This type of battery holder is shown in FIGS. 16 and 17. Holder plates are disposed between multiple batteries 1 allowing multiple batteries 1 to be arranged in specified positions in an array with multiple rows and columns.

In the battery holder of the present invention, second connecting tabs provided on a flat-plate holder can be inserted into connecting holes provided in the second plate of an L-shaped holder to connect the flat-plate holder in the same plane as the first plate of the L-shaped holder and dispose holder plates between batteries. This type of battery holder is shown in FIGS. 18 and 19. Two batteries 1 are disposed in specified positions via holder plates.

The battery array of the present invention is provided with a plurality of batteries, which can be recharged, arranged in parallel orientation, and a battery holder that holds batteries in specified positions by disposing plates between the plurality of parallel oriented batteries. The battery holder is provided with L-shaped holders each having a first plate and second plate connected at a right angle corner and having an L-shaped lateral cross-section, and flat-plate holders that connect with the L-shaped holders and have an overall planar form. An L-shaped holder has connecting holes on the outside of the corner between the first plate and second plate. Further, the outer edge of the first plate opposite the corner with the second plate is provided with first connecting tabs that can connect with connecting holes of another L-shaped holder. A flat-plate holder is provided with second connecting tabs on at least one side edge that connect with connecting holes of an L-shaped holder.

The battery array described above has the characteristic that while it has an extremely simple structure, both the number of rows and columns of batteries held can be changed without restraint. This is because connection combinations of L-shaped holders and flat-plate holders can be changed to change without restraint the number of rows and columns of batteries held.

In the battery array of the present invention, second connecting tabs provided on flat-plate holders can be inserted into L-shaped holder connecting holes to connect a plurality of plates in a mutually orthogonal and parallel arrangement, and batteries can be disposed between those plates.

In the battery array of the present invention, first connecting tabs provided on L-shaped holders can be inserted into connecting holes in other L-shaped holders to connect a plurality of plates in a mutually orthogonal and parallel arrangement, and batteries can be disposed between those plates.

In the battery array of the present invention, an L-shaped holder can have retaining ribs established along the same first plate edge that is provided with first connecting tabs. Retaining ribs can be formed as a single piece with the holder to retain a connected plate at a right angle.

In the battery array of the present invention, a flat-plate holder can have retaining ribs established along the same edge that is provided with second connecting tabs. Retaining ribs can be formed as a single piece with the holder to retain a connected plate at a right angle.

In the battery array of the present invention, a holder plate can have a width and length suitable for holding a circular cylindrical battery.

In the battery array of the present invention, first connecting tabs provided on L-shaped holders can be inserted into connecting holes in other L-shaped holders to connect a plurality of L-shaped holders in a row or column. Multiple holder plates in a row or column can be arranged with holder plates between batteries.

In the battery array of the present invention, second connecting tabs on flat-plate holders can be inserted into connecting holes provided in L-shaped holders to connect L-shaped holders and flat-plate holders to establish a multiple row and column array with holder plates disposed between batteries.

In the battery array of the present invention, first connecting tabs provided on L-shaped holders can be inserted into connecting holes provided in the second plates of other L-shaped holders to connect a plurality of L-shaped holders in a row. Further, first connecting tabs provided on L-shaped holders can be inserted into connecting holes provided in the first plates of other L-shaped holders to connect a row of L-shaped holders into a plurality of rows. Still further, second connecting tabs provided on flat-plate holders can be inserted into connecting holes provided in L-shaped holders to connect flat-plate holders in the same plane as an L-shaped holder plate and establish a plurality of plates in a multiple row and column array with holder plates disposed between batteries.

In the battery array of the present invention, second connecting tabs provided on a flat-plate holder can be inserted into connecting holes provided in the second plate of an L-shaped holder to connect the flat-plate holder in the same plane as the first plate of the L-shaped holder and dispose holder plates between batteries.

The above and further objects of the present invention as well as the features thereof will become more apparent from the following detailed description to be made in conjunction with the accompanying drawings.

DETAILED DESCRIPTION OF THE EMBODIMENTS

Figure 1:
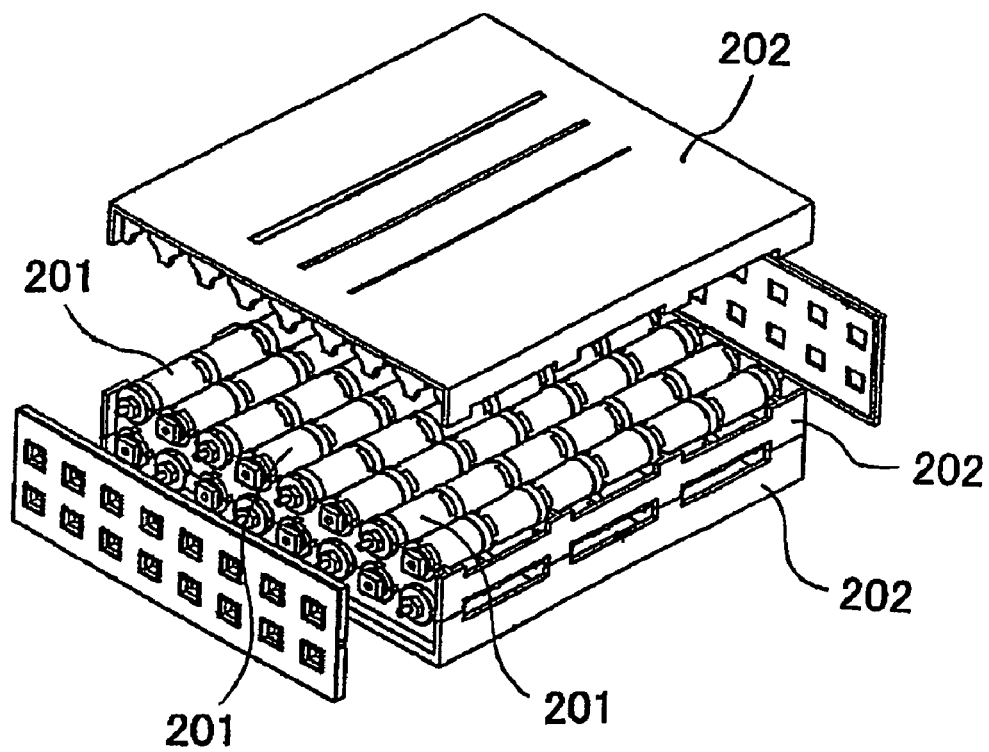
FIG. 1 is a perspective view of a prior art battery array.

Each of the battery arrays shown in FIGS. 2-19 has a plurality of batteries 1, which can be recharged, disposed in specified positions in a battery holder 2. The battery holder 2 is made up of L-shaped holders 3 and flat-plate holders 4. By changing the combinations of L-shaped holders 3 and flat-plate holders 4, the plurality of batteries 1 can be disposed in a plurality of columns, and in one or a plurality of rows. L-shaped holders 3 and flat-plate holders 4 are formed of insulating plastic.

In this patent application, the number of rows and columns for a plurality of batteries arrayed in multiple rows and columns is defined by the figures. Specifically, in this patent application, the number of batteries arranged in the vertical direction of a figure is taken as the number of rows, and the number of batteries arranged left to right in a figure is taken as the number of columns.

Any batteries that can be recharged such as lithium ion batteries or nickel hydride batteries can be used as batteries 1. The batteries 1 are circular cylindrical batteries. However, rectangular batteries can also be used. Positive and negative electrode terminals are provided at the ends of each battery 1. The batteries 1 are held in specified positions and in parallel orientation by the battery holder 2. Lead plates 31 are attached at both ends of the batteries 1 by a method such as spot welding, and the batteries 1 are electrically connected in series or parallel via the lead plates 31.

Figure 20:
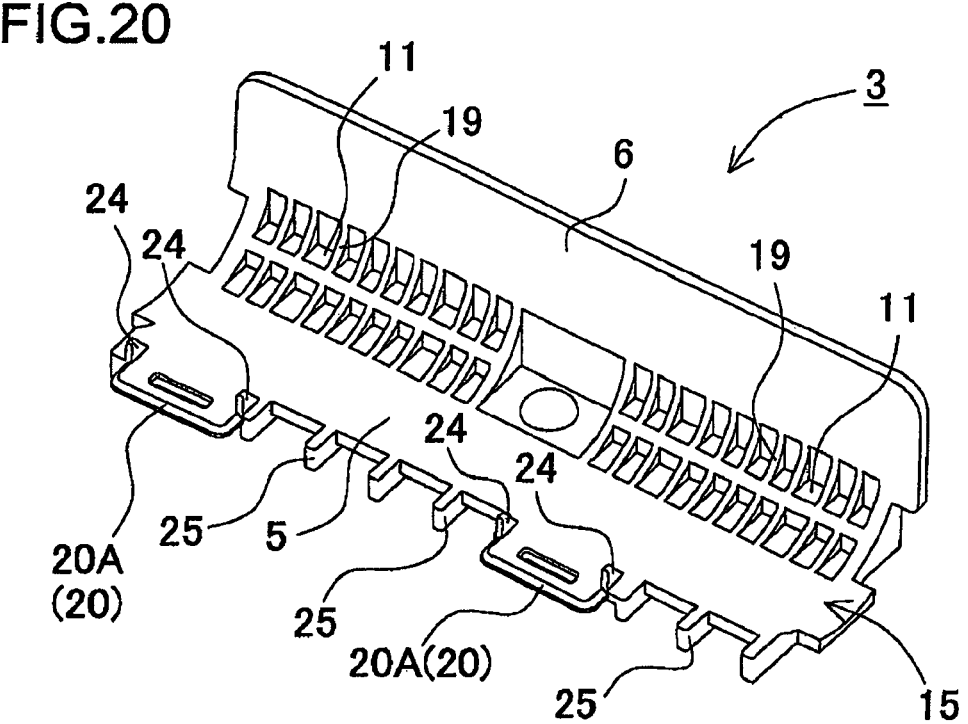
FIG. 20 is a perspective view of an L-shaped holder.
Figure 21:
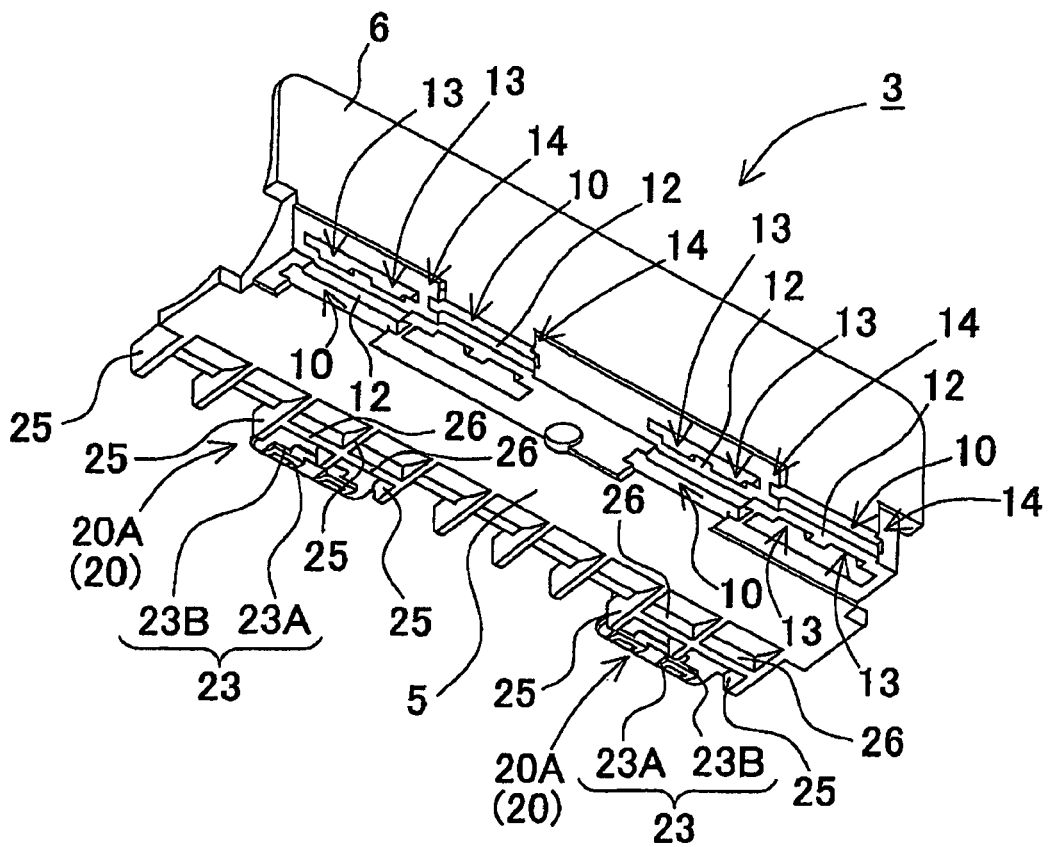
FIG. 21 is a perspective view from below of the L-shaped holder shown in FIG. 20.
Figure 22:
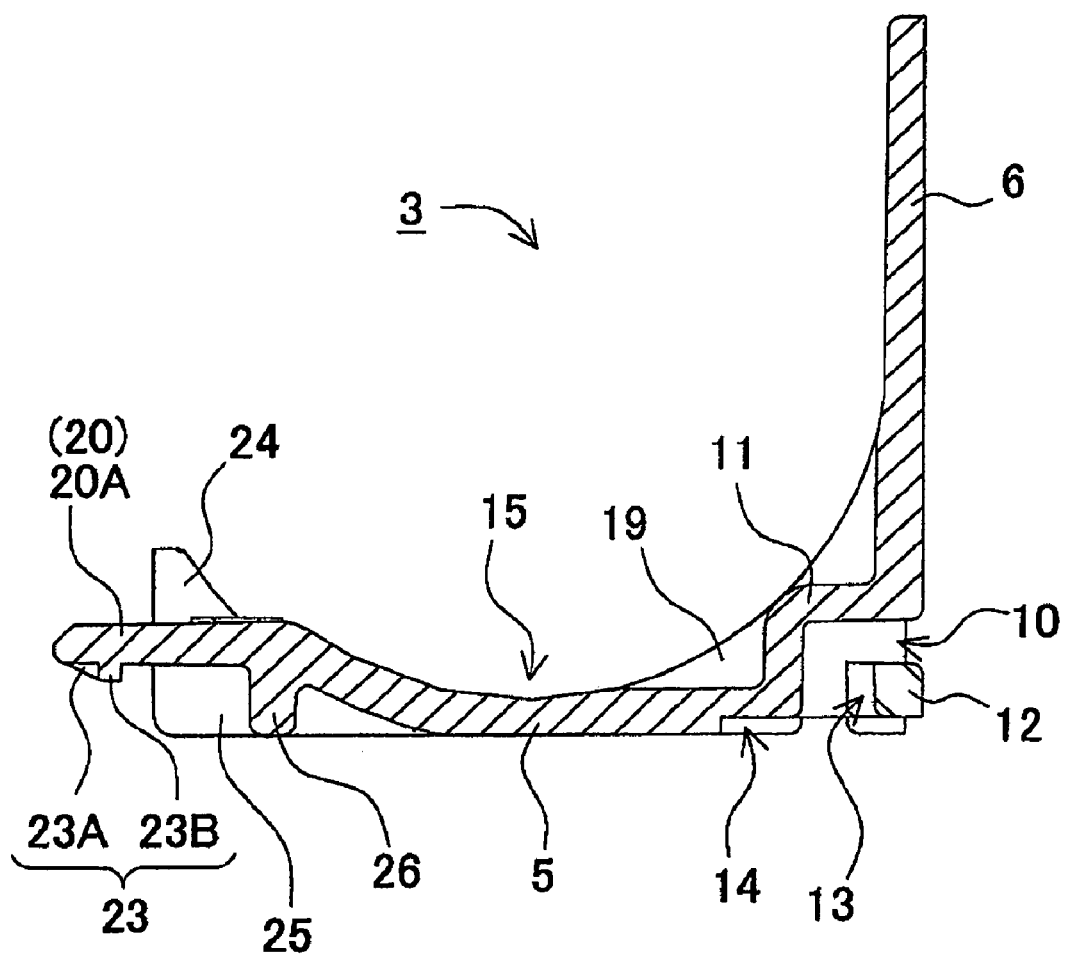
FIG. 22 is a cross-sectional view of the L-shaped holder shown in FIG. 20.

As shown in FIGS. 20-22, an L-shaped holder 3 has the form of two plates, which are a first plate 5 and second plate 6, connected at a right angle corner, and it has a lateral cross-section that is L-shaped. Curved ribs 19, which conform to the surface of a circular cylindrical battery 1, are formed as a single piece with the L-shaped holder 3 at the inside of the corner region connecting the first plate 5 and the second plate 6. The L-shaped holder 3 of FIG. 20 has a plurality of curved ribs 19 arranged in a parallel fashion that establishes gaps between them. The connection between the first plate 5 and the second plate 6 of the L-shaped holder 3 is reinforced by the curved ribs 19. Further, a circular cylindrical battery 1 can be retained inside the curved ribs 19 without shifting out of position.

An L-shaped holder 3 has connecting holes 10 established at the outside of the corner region between the first plate 5 and the second plate 6. The L-shaped holder 3 of FIG. 21 has long narrow rectangular connecting holes 10 established along the outside of the corner region. The L-shaped holder 3 has a pair of connecting holes 10 provided at each end. A lateral cross-section of the corner region of an L-shaped holder 3 is shown in FIG. 22. To establish connecting holes 10 at the outside of the corner region of the L-shaped holder 3, folded regions 11 are established that redirect the first plate 5 and the second plate 6 to project inward at the corner region. Folded regions 11 are formed that connect with, and reinforce the curved ribs 19. In addition, folded regions 11 are formed such that they do not project out from the curved ribs 19. This is to allow a circular cylindrical battery 1 to be disposed inside the curved ribs 19. At a folded region 11, the first plate 5 and the second plate 6 bend inward at right angles to form another right angle that projects inward at the corner region. To establish connecting holes 10 in the first plate 5 and the second plate 6, rods 12 are formed as a single piece with the L-shaped holder 3 separated from the outside of the folded regions 11.

A rod 12 is positioned at the outside of the corner between the first plate 5 and the second plate 6, and a connecting hole 10 is established between the rod 12 and an outside surface of the folded region 11. Recessed regions 13 are provided on a surface of the rod 12 opposite another outside surface of the folded region 11. The rods 12 of FIG. 21 are provided with recessed regions 13 at both (lengthwise) ends of the rods 12. Further, as shown in FIG. 22, recessed regions 13 are established on only one side of a rod 12 opposite an outside surface of the folded region 11. In the L-shaped holder 3 of FIG. 21, the rod 12 that forms the connecting hole 10 at the furthest left side of the figure and the rod 12 that forms the third connecting hole 10 from the left have recessed regions 13 provided on upper surfaces of the rods 12. Rods 12 that form the second connecting hole 10 from the left and the furthest connecting hole 10 to the right have recessed regions 13 provided on left side surfaces of the rods 12. Although further detail is provided later, recessed regions 13 establish locking regions that mate with locking projections on connecting tabs 20, which insert into the connecting holes 10. Consequently, L-shaped holder connecting holes 10 are formed between the side of a rod 12 having no recessed regions 13 and an outside surface of a folded region 11. Connecting tabs 20 are inserted into those connecting holes 10.

An L-shaped holder 3 is also provided with very slightly recessed surfaces 14 at the outside of the corner region where connecting tabs 20 are inserted to connect flat-plate holders 4 or L-shaped holders. These recessed surfaces 14 position and align retaining ribs 24, which are established on both sides of the connecting tabs 20, and dispose the holders in specified positions.

The first plate 5 of an L-shaped holder 3 is provided with first connecting tabs 20A that insert into connecting holes 10. First connecting tabs 20A are formed as a single piece with the L-shaped holder 3 at the outer edge of the first plate 5 opposite the corner connecting the first plate 5 and the second plate 6. The L-shaped holders 3 are provided with two first connecting tabs 20A.

One of the first connecting tabs 20A is established at one end of the outer edge of the first plate 5. The other first connecting tab 20A is established at a position inward from the other end of the outer edge. First connecting tabs 20A of one L-shaped holder 3 are inserted into connecting holes 10 of another L-shaped holder 3 to join the L-shaped holders 3. Therefore, first connecting tabs 20A are established in positions that insert into connecting holes 10 on other L-shaped holders 3. L-shaped holders 3 with first connecting tabs 20A inserted in connecting holes 10 have both ends of their plates positioned in common respective planes. Said differently, first connecting tabs 20A and connecting holes 10 are positioned to align a plurality of L-shaped holders 3 with first connecting tabs 20A inserted in connecting holes 10 such that both ends of the holders lie in common respective planes.

As shown in FIGS. 21 and 22, first connecting tabs 20A are provided with locking projections 23 on their bottom surfaces. With connecting tabs 20 inserted in connecting holes 10, locking projections 23 interlock with recessed regions 13 on the rods 12 inside connecting holes 10.

The L-shaped holder 3 of FIGS. 21 and 22 is provided with locking projections 23 at both ends of the bottom surface of each first connecting tab 20A. These locking projections 23 insert into the recessed regions 13 provided at both ends of each rod 12 that establishes a connecting hole 10. The locking projections 23 shown in FIG. 21 take the form of sets of two parallel inclined ribs 23A connected at the rear by locking ribs 23B. Inclined ribs 23A are established extending in the insertion direction of the first connecting tab 20A and are inclined with a slope the declines towards the tip of the first connecting tab 20A. A connecting tab 20 provided with these locking projections 23 can be smoothly inserted into a connecting hole 10. Further, locking ribs 23B have the same height as the aft end of the inclined ribs 23A. With first connecting tabs 20A inserted in connecting holes 10, locking ribs 23B hook into the recessed regions 13 in rods 12 in a manner that is not easily dislodged. First connecting tabs 20A described here can be inserted smoothly into connecting holes 10 for a connection that does not easily come apart.

With first connecting tabs 20A inserted in connecting holes 10, two plates are aligned in the same plane while other plates are disposed in planes perpendicular to that common plane. Said differently, first connecting tabs 20A and connecting holes 10 are established such that L-shaped holders 3 connect in a manner that orients two plates in the same plane and other plates perpendicular to that plane. Consequently, as shown in the cross-section of FIG. 22, the outer edge of the first plate 5 is curved upward from the bottom surface. Specifically, the outer edge of the first plate 5 is curved upward by an amount equivalent to the thickness of a rod 12, and first connecting tabs 20A are established at that raised outer edge.

The upward curved outer edge of the first plate 5 has a plurality of projecting ribs 25 formed as a single piece extending from the bottom surface. Projecting ribs 25 protrude from positions where their tips can contact the surface of another connected L-shaped holder 3. The undersides of first connecting tabs 20A on the first plate 5 of FIG. 21 are provided with a plurality of projecting ribs 25. Each first connecting tab 20A is provided with three projecting ribs 25 on its underside: one on either side and one in the middle. These projecting ribs 25 are linked by connecting ribs 26 formed as a single piece on the underside of the first connecting tab 20A. Tips of the first connecting tabs 20A extend further outward than projecting ribs 25 to insert into connecting holes 10.

Retaining ribs 24 are formed as a single piece on the outer edge of the first plate 5. The first plate 5 of FIG. 20 is provided with retaining ribs 24 on both sides of each first connecting tab 20A. The front (outer) edges of the retaining ribs 24 contact the surface of a connected L-shaped holder 3 to hold the first plate 5 at a right angle with respect to the connected plate. Consequently, front edges of retaining rib 24 are surfaces perpendicular to the protruding direction of first connecting tab 20A. In addition, front edges of retaining rib 24 contact the surface of an L-shaped holder 3 to establish the insertion position of first connecting tabs 20A. First connecting tabs 20A insert in connecting holes 10 until a position is reached where retaining ribs 24 contact the surface of the L-shaped holder 3. At that position, the locking ribs 23B described previously hook into the recessed regions 13 to hold first connecting tabs 20A in connecting holes 10 in a locked configuration. In this configuration, projecting ribs 25 and retaining ribs 24 are in contact with the surface of the connected L-shaped holder 3, and the first plate 5 is connected perpendicular with respect to the plate provided with the connecting holes 10.

The length and width dimensions of the first plate 5 and the second plate 6 are such that those plates can be disposed between, and retain batteries 1. The width of the first plate 5 and the second plate 6 is preferably designed to be equal to, or approximately equal to the width of the batteries 1. Similarly, the length of the first and second plate is designed to be equal to, or approximately equal to the length of the batteries 1. Further, to hold a circular cylindrical battery 1 on its surface, each first plate 5 is provided with a shallow curved trough 15 along the plate center extending in the lengthwise direction. This plate can hold a circular cylindrical battery 1 disposed in its curved trough 15 in a specified position without shifting position.

Figure 23:
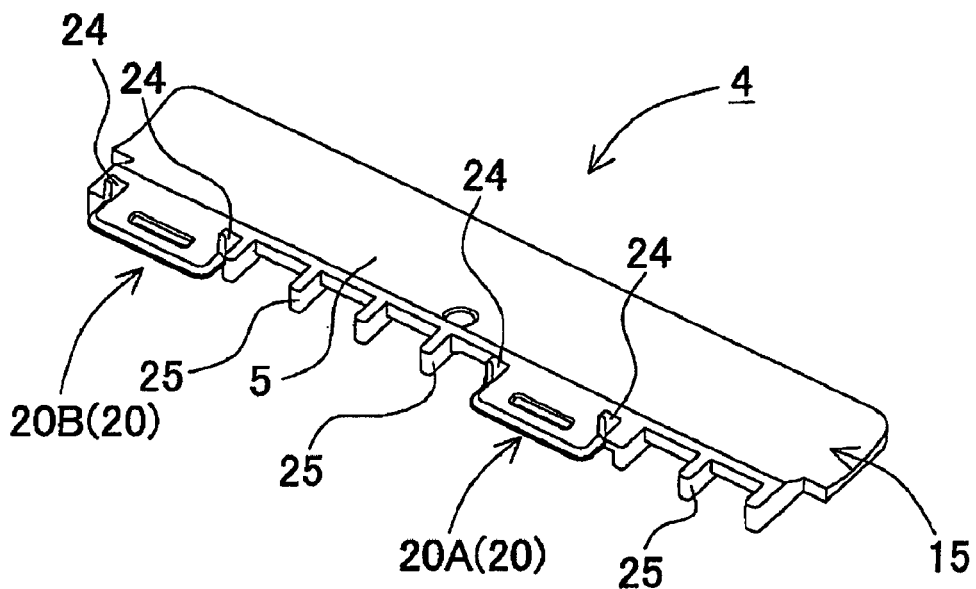
FIG. 23 is a perspective view of a flat-plate holder.
Figure 24:
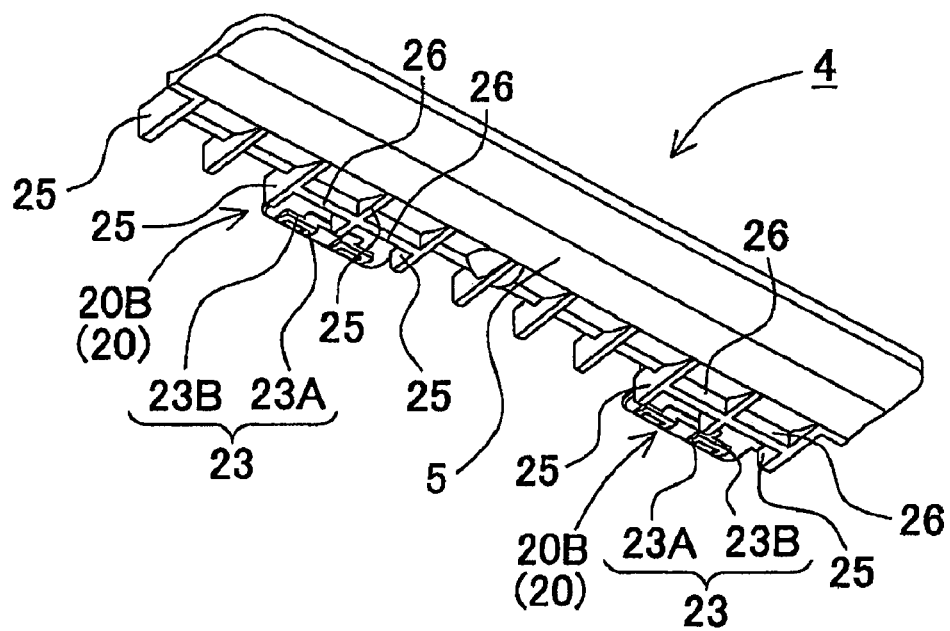
FIG. 24 is a perspective view from below of the flat-plate holder shown in FIG. 23.

As shown in FIGS. 23 and 24, flat-plate holders 4 are formed of plastic in a plate configuration having the same length and width as the first plate 5 and the second plate 6. Further, the front edge of a flat-plate holder 4 has the same shape as the outer edge of a first plate 5. Consequently, the front edge of a flat-plate holder 4 is provided with second connecting tabs 20B, projecting ribs 25, and retaining ribs 24. Second connecting tabs 20B insert into L-shaped holder 3 connecting holes 10 to connect a flat-plate holder 4 to an L-shaped holder 3.

L-shaped holders 3 and flat-plate holders 4 configured as described above can be assembled in combination to make various battery arrays as described below.

Figure 2:
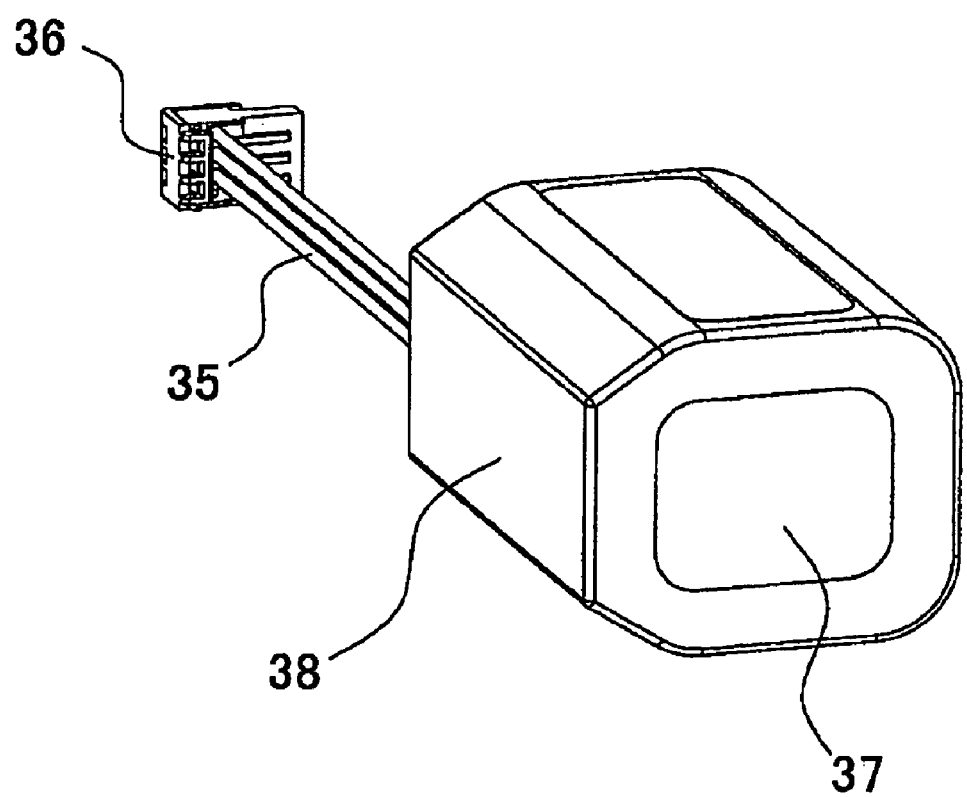
FIG. 2 is a perspective view of a battery array constructed in accordance with a first embodiment of the present invention.
Figure 3:
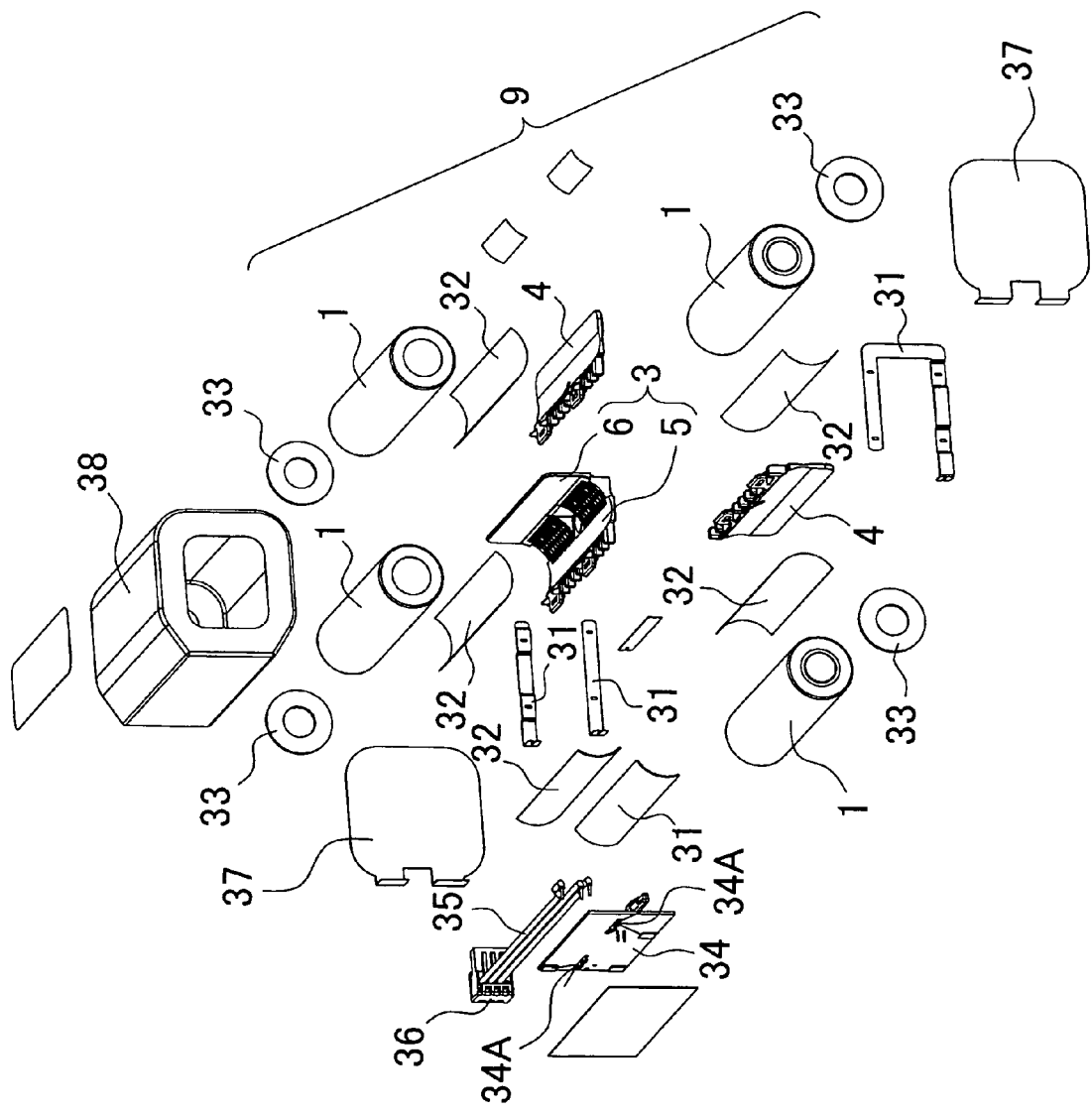
FIG. 3 is an exploded perspective view of the battery array shown in FIG. 2.
Figure 4:
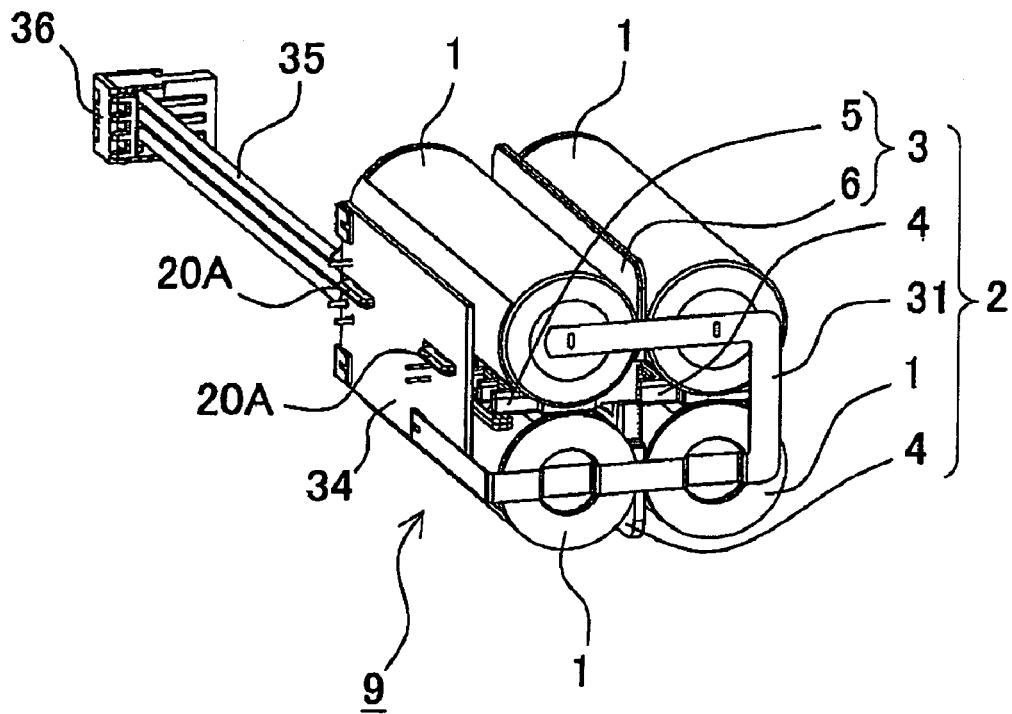
FIG. 4 is a perspective view of the battery assembly for the battery array shown in FIG. 3.
Figure 5:
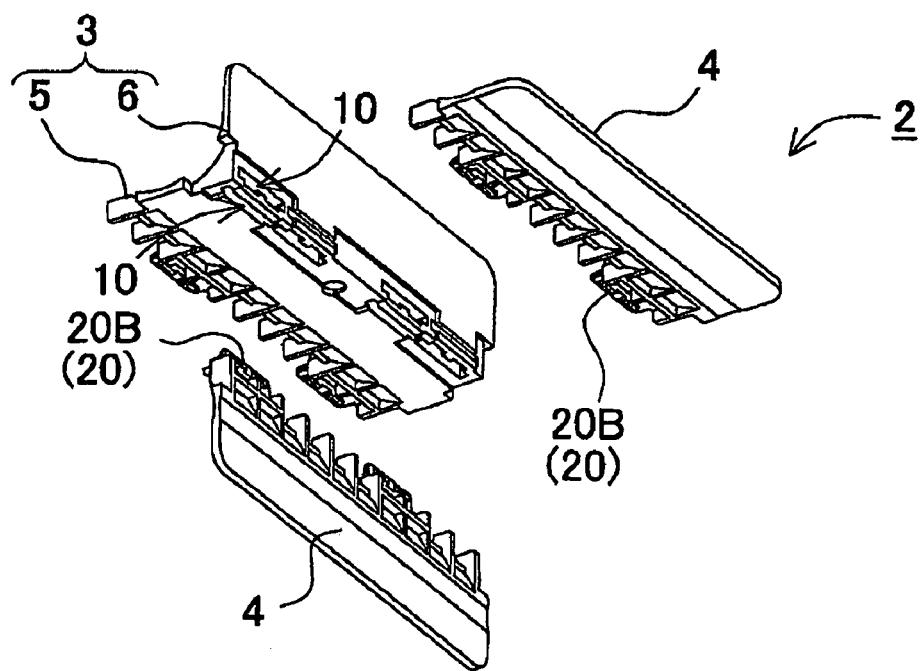
FIG. 5 is an exploded perspective view of the battery holder for the battery array shown in FIG. 4.

The battery array shown in FIGS. 2-4 has four circular cylindrical batteries 1 disposed in specified positions in two rows and two columns by a battery holder 2. As shown in FIG. 5, connecting tabs 20 of two flat-plate holders 4 are inserted in the connecting holes 10 of one L-shaped holder 3. Specifically, flat-plate holders 4 are connected to first plate 5 and second plate 6 connecting holes 10 of an L-shaped holder 3 to establish a cross-shaped configuration of four plates. As shown in FIGS. 3 and 4, this battery array has battery holder plates disposed between an array of four batteries 1.

As shown in FIGS. 3 and 4, this battery array has a battery assembly 9 that arranges the batteries 1 in specified positions via the battery holder 2 and provides the necessary parts to complete the assembly. The battery array has four batteries 1 disposed in specified positions by the battery holder 2 and electrically connected via lead plates 31 to form the battery assembly 9. In addition, the battery array of FIG. 3 has double-sided adhesive tape 32 disposed between the batteries 1 and the battery holder 2. Double-sided adhesive tape 32 adheres to, and attaches batteries 1 to the plates of the battery holder 2. Further, double-sided adhesive tape 32 is attached to curved troughs 15 in plate surfaces and to circular cylindrical battery 1 surfaces to reliably hold circular cylindrical batteries 1 in fixed positions in the battery holder 2. In addition, insulating rings 33 are disposed at both ends of each circular cylindrical battery 1. Lead plates 31 are connected to exposed electrodes at centers of insulating rings 33 by a method such as spot welding.

The battery assembly 9 also has a circuit board 34, and electronic parts are mounted on that circuit board 34 to implement battery protection circuitry. The circuit board 34 is provided with through holes 34A to insert first connecting tabs 20A for connection with an L-shaped holder 3. First connecting tabs 20A are inserted into the through holes 34A to attach the circuit board 34 in a fixed position on the battery holder 2. Further, the circuit board 34 is electrically connected to the batteries 1 via the lead plates 31, and battery voltage and current is detected to control battery charging and discharging. The circuit board 34 also has lead wires 35 connected, and an output connector 36 is provided at the end of those lead wires 35. Insulating plates 37 are disposed at both ends of the battery assembly 9, and assembly surfaces are covered by heat-shrink tubing 38.

Figure 6:
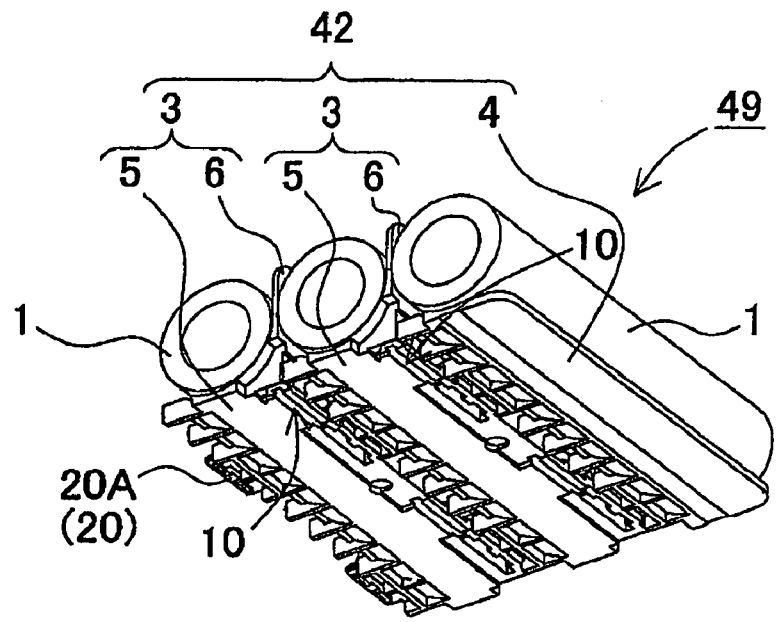
FIG. 6 is a perspective view from below of a battery array constructed in accordance with a second embodiment of the present invention.
Figure 7:
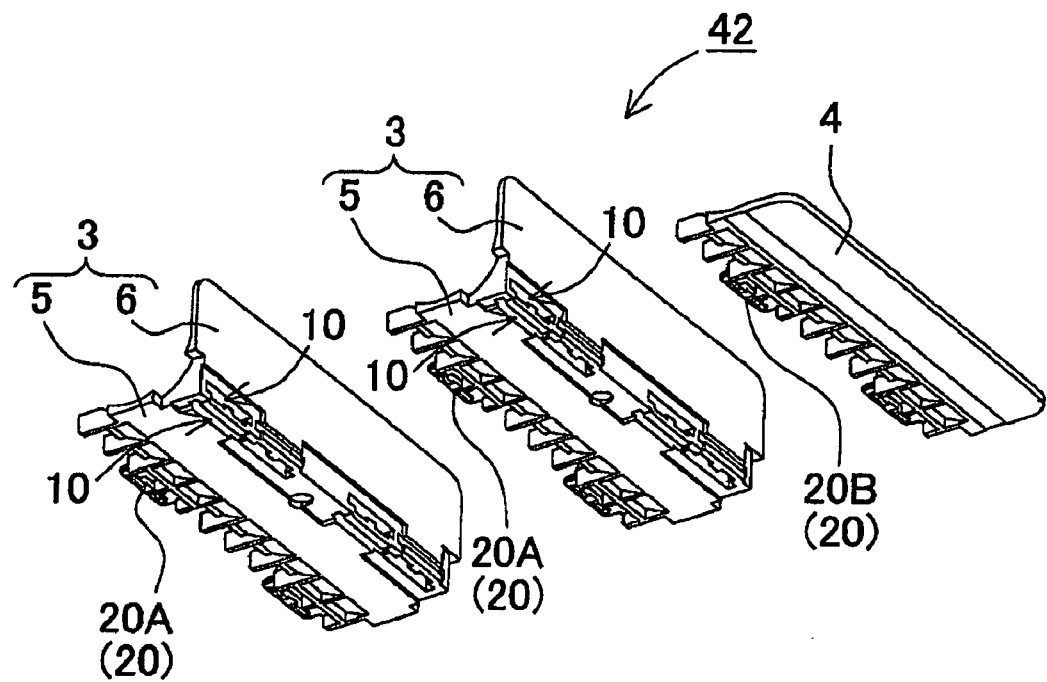
FIG. 7 is an exploded perspective view of the battery holder for the battery array shown in FIG. 6.
Figure 8:
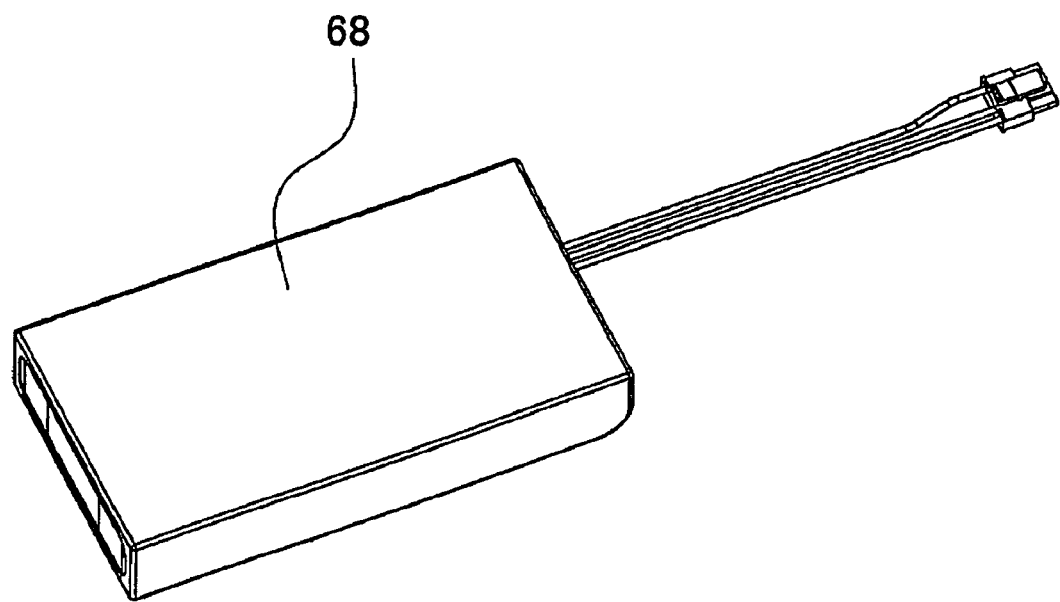
FIG. 8 is a perspective view of a battery array constructed in accordance with a third embodiment of the present invention.

The battery array of FIG. 6 has three circular cylindrical batteries 1 held in specified positions in one row and three columns by a battery holder 42. As shown in FIG. 7, two L-shaped holders 3 and one flat-plate holder 4 are connected to make a battery holder 42 that holds three batteries 1. First connecting tabs 20A of one L-shaped holder 3 are inserted in connecting holes 10 established in the second plate 6 of another L-shaped holder 3 to connect two L-shaped holders 3 in the lateral (left-right) direction. In addition, second connecting tabs 20B of a flat-plate holder 4 are inserted in second plate 6 connecting holes 10 of the L-shaped holder 3 on the right side of the figures. This battery holder 42 has three plates oriented in the same plane and two plates arranged perpendicular to those plates allowing three batteries 1 to be disposed between the plates. Batteries 1 are disposed between the plates of the battery holder 42 to make the battery assembly 49. The battery assembly 49 is assembled in the same manner as described for the battery array of FIGS. 2-4.

Figure 9:
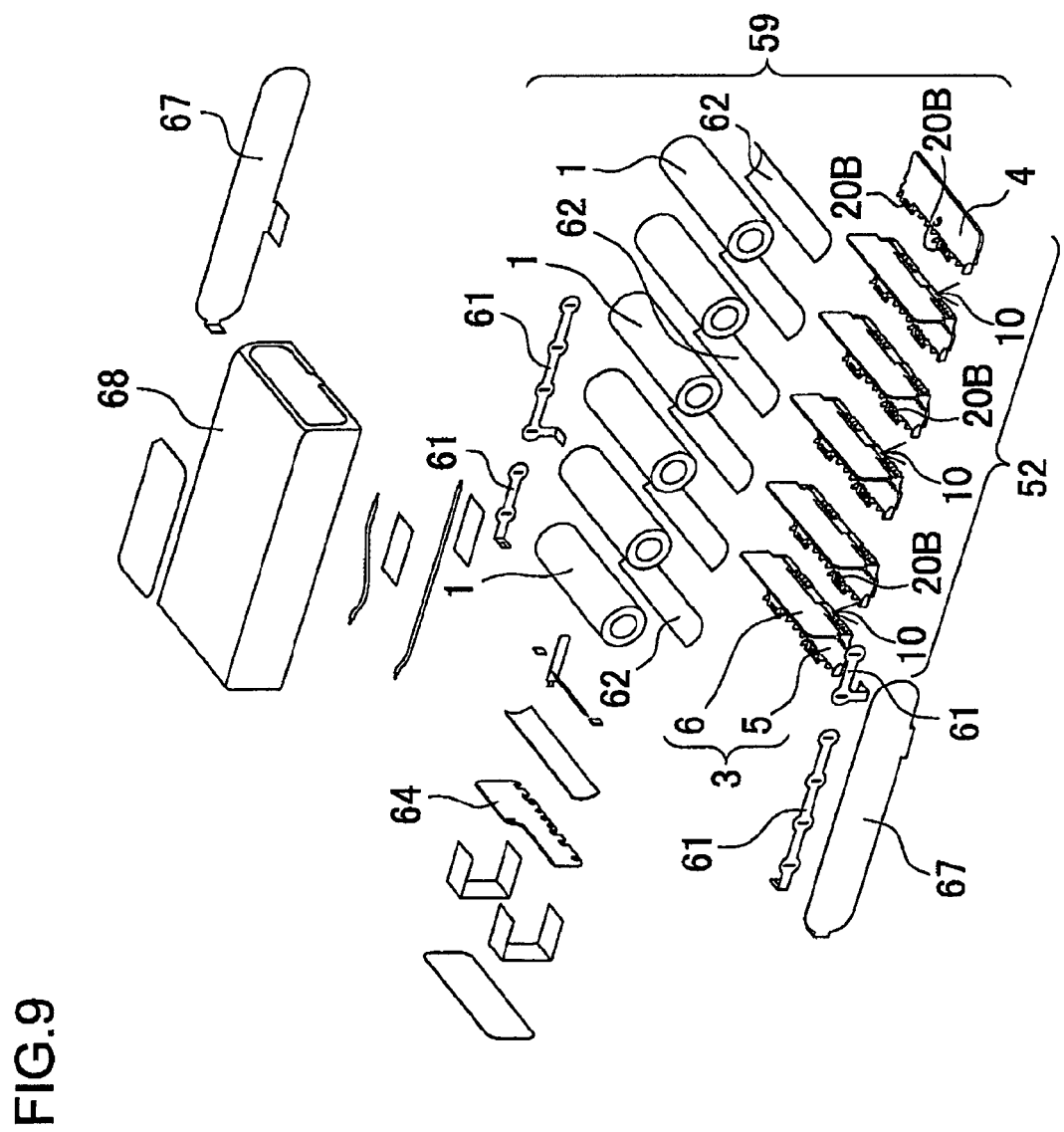
FIG. 9 is an exploded perspective view of the battery array shown in FIG. 8.
Figure 10:
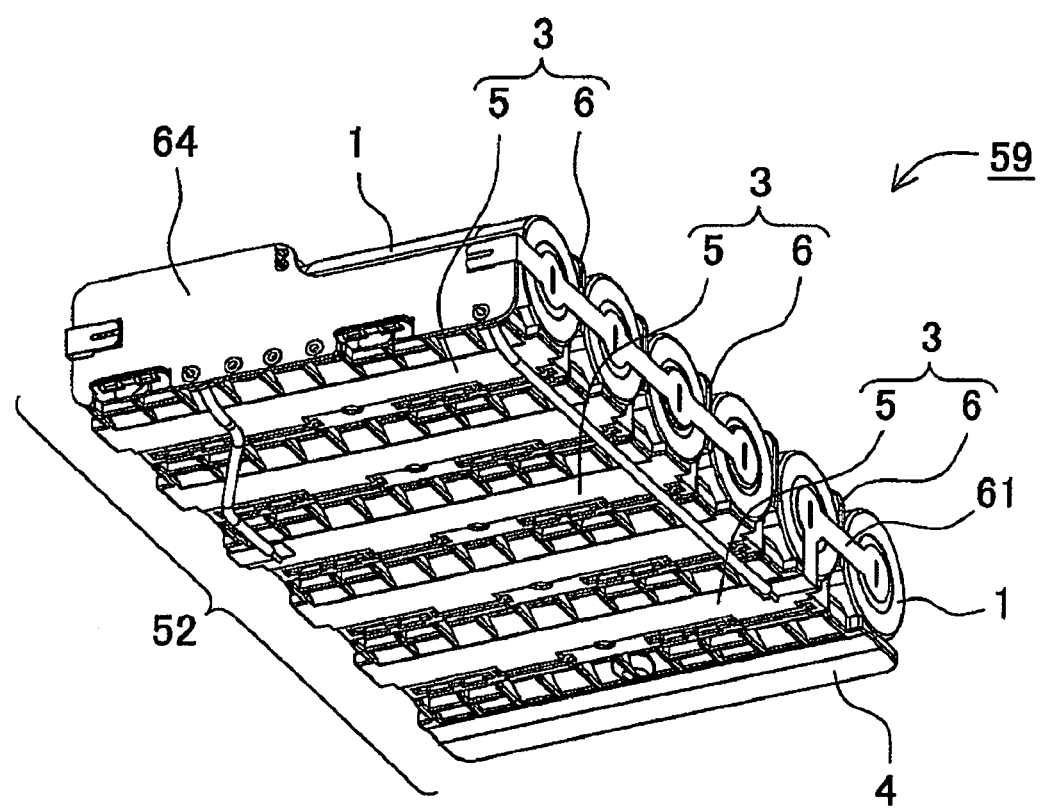
FIG. 10 is a perspective view from below of the battery assembly for the battery array shown in FIG. 9.
Figure 11:
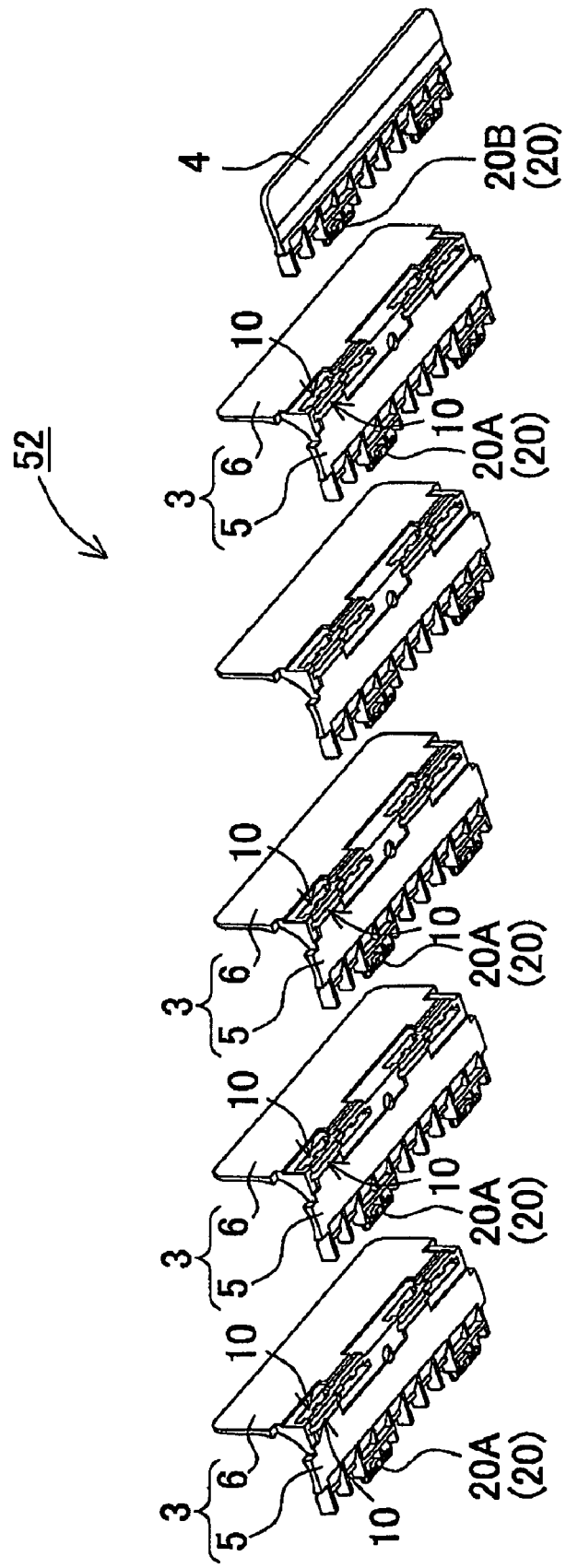
FIG. 11 is an exploded perspective view of the battery holder for the battery array shown in FIG. 10.

Although the battery array described above has two L-shaped holders 3 connected in two columns, three or more columns of L-shaped holders 3 can be connected together to make a battery array that holds many batteries 1. The battery array shown in FIGS. 8-10 has six batteries 1 held in a battery holder 52 and disposed in six columns. As shown in FIG. 11, first connecting tabs 20A are inserted in connecting holes 10 established in second plates 6 to connect five L-shaped holders 3 in five columns. A flat-plate holder 4 is connected with second plate 6 connecting holes 10 of the L-shaped holder 3 on the furthest right side of FIG. 11 to make the battery holder 52. As shown in FIGS. 9 and 10, circular cylindrical batteries 1 are attached to the battery holder 52 with double-sided adhesive tape 62, batteries 1 are electrically connected together via lead plates 61, a circuit board 64 is connected to make the battery assembly 59, and heat-shrink tubing 68 is applied to surfaces of the battery assembly 59 to complete fabrication of this type of battery array. In this case, insulating plates 67 are disposed at both ends of the battery assembly 59 and the surfaces are covered by heat-shrink tubing 68. However, the battery assembly can also be inserted in an external case (not illustrated) instead of being covered with heat-shrink tubing, or it can be covered with heat-shrink tubing and held in an external case to complete battery array assembly.

Figure 12:
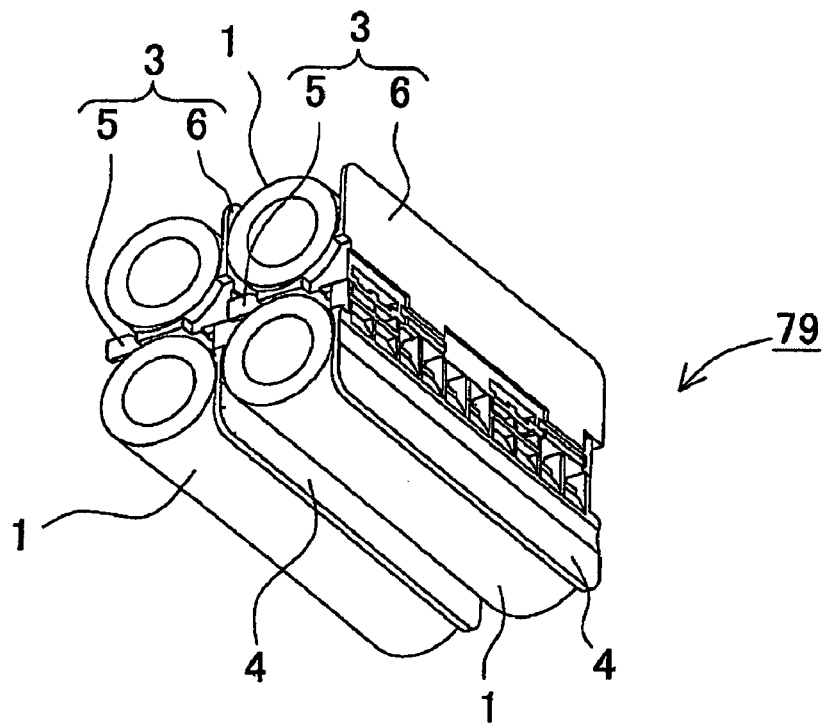
FIG. 12 is a perspective view from below of a battery array constructed in accordance with a fourth embodiment of the present invention.
Figure 13:
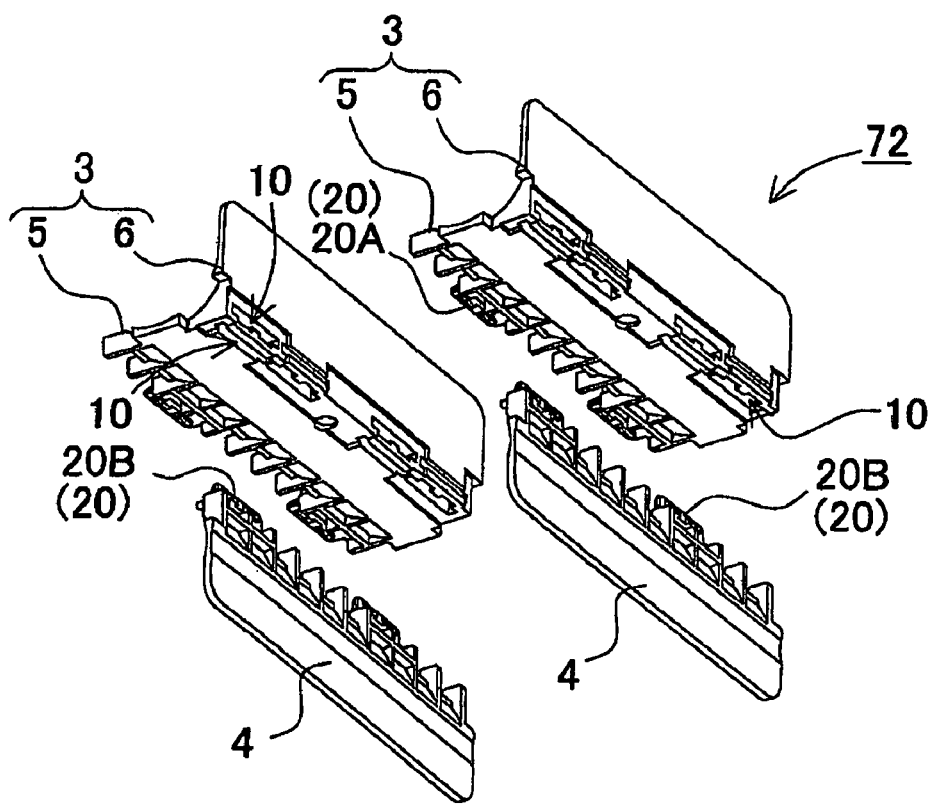
FIG. 13 is an exploded perspective view of the battery holder for the battery array shown in FIG. 12.

The battery array of FIG. 12 has four batteries 1 disposed in two rows and two columns in a battery holder 72. The battery holder 72 is made of two L-shaped holders 3 and two flat-plate holders 4 to hold four batteries 1. As shown in FIG. 13, two L-shaped holders 3 are connected in a row having two columns and flat-plate holders 4 are connected in connecting holes 10 of the first plate 5 of each L-shaped holder 3. This battery array can be assembled in the same manner as the battery array shown in FIGS. 2-4. Specifically, batteries 1 can be arranged in specified positions in the battery holder 72 to form the battery assembly 79, and the battery assembly 79 can be covered with heat-shrink tubing or inserted in an external case to assemble the battery array. The number of connected L-shaped holders and flat-plate holders in this battery holder 72 can be increased to hold many batteries in two rows.

Figure 14:
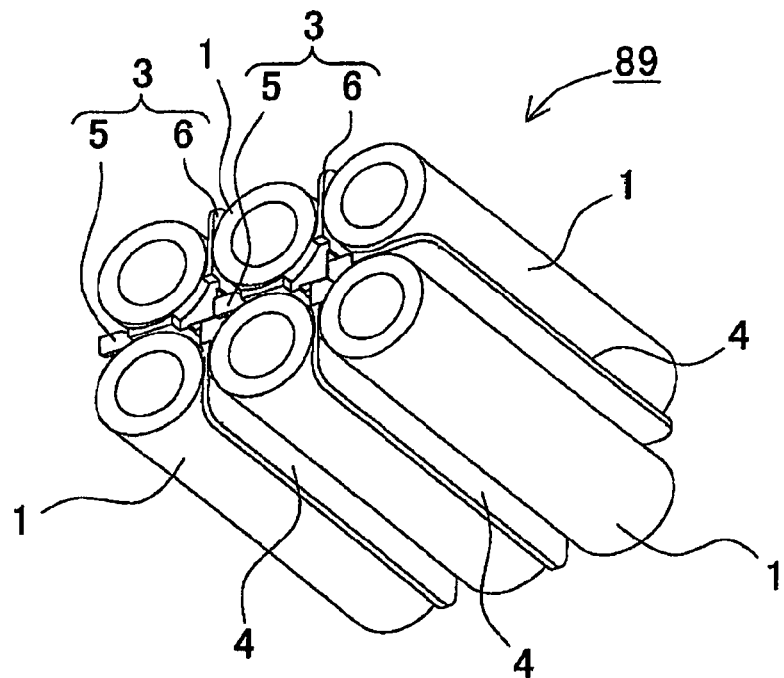
FIG. 14 is a perspective view from below of a battery array constructed in accordance with a fifth embodiment of the present invention.
Figure 15:
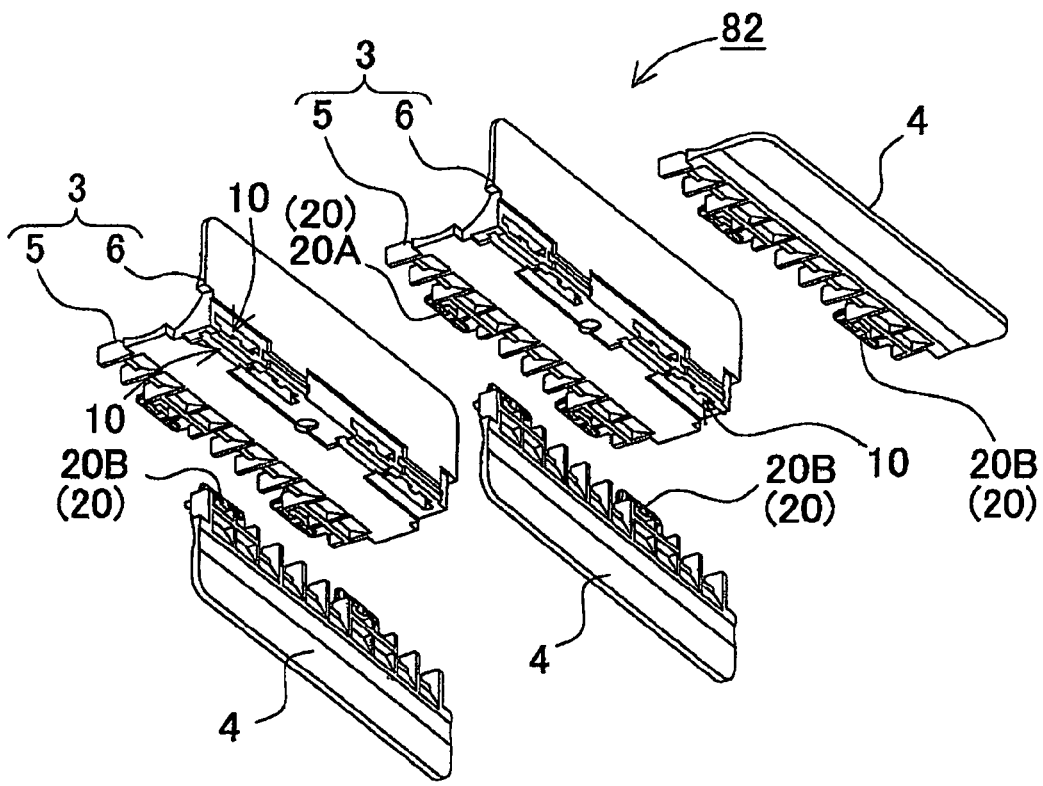
FIG. 15 is an exploded perspective view of the battery holder for the battery array shown in FIG. 14.

The battery array of FIG. 14 has six batteries 1 disposed in two rows and three columns in a battery holder 82. The battery holder 82 is made of two L-shaped holders 3 and three flat-plate holders 4 to hold six batteries 1. As shown in FIG. 15, two L-shaped holders 3 are connected in a row having two columns and flat-plate holders 4 are connected in all remaining connecting holes 10 of each L-shaped holder 3. This battery array can also be assembled in the same manner as the battery array shown in FIGS. 2-4. Specifically, batteries 1 can be arranged in specified positions in the battery holder 82 to form the battery assembly 89, and the battery assembly 89 can be covered with heat-shrink tubing or inserted in an external case to assemble the battery array.

Figure 16:
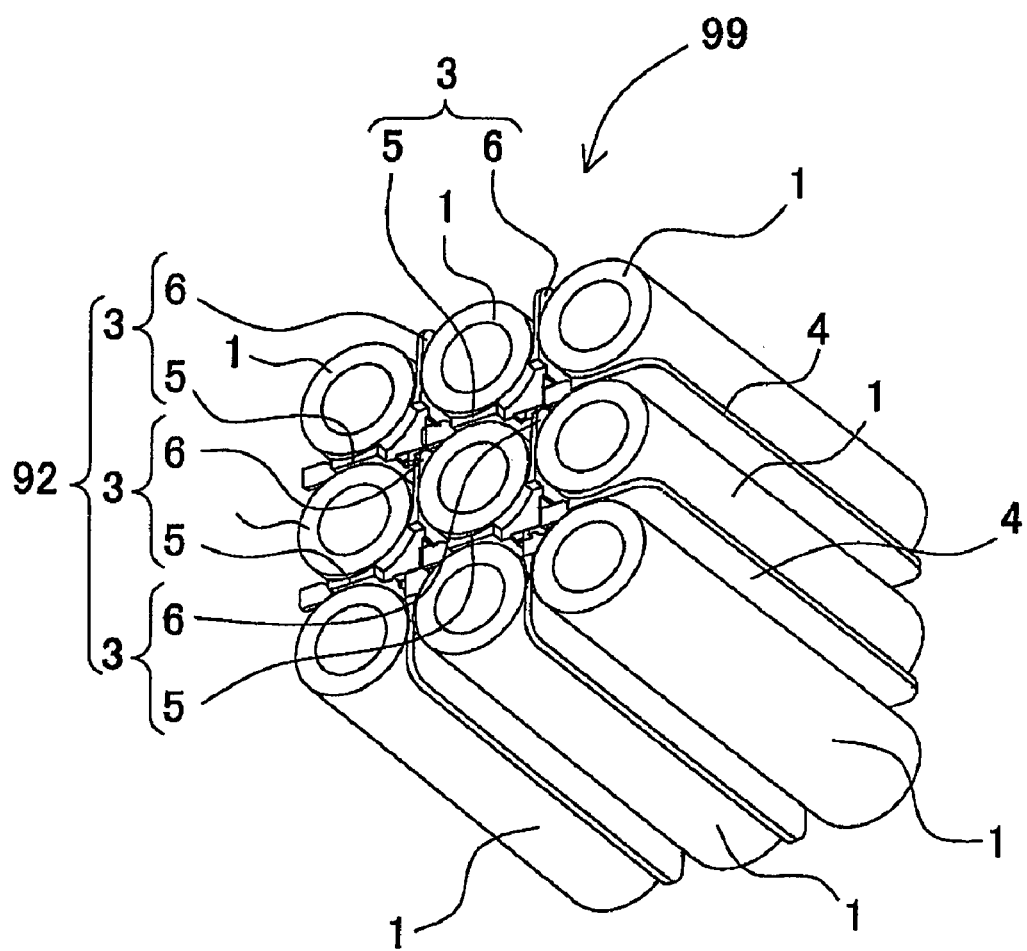
FIG. 16 is a perspective view from below of a battery array constructed in accordance with a sixth embodiment of the present invention.
Figure 17:
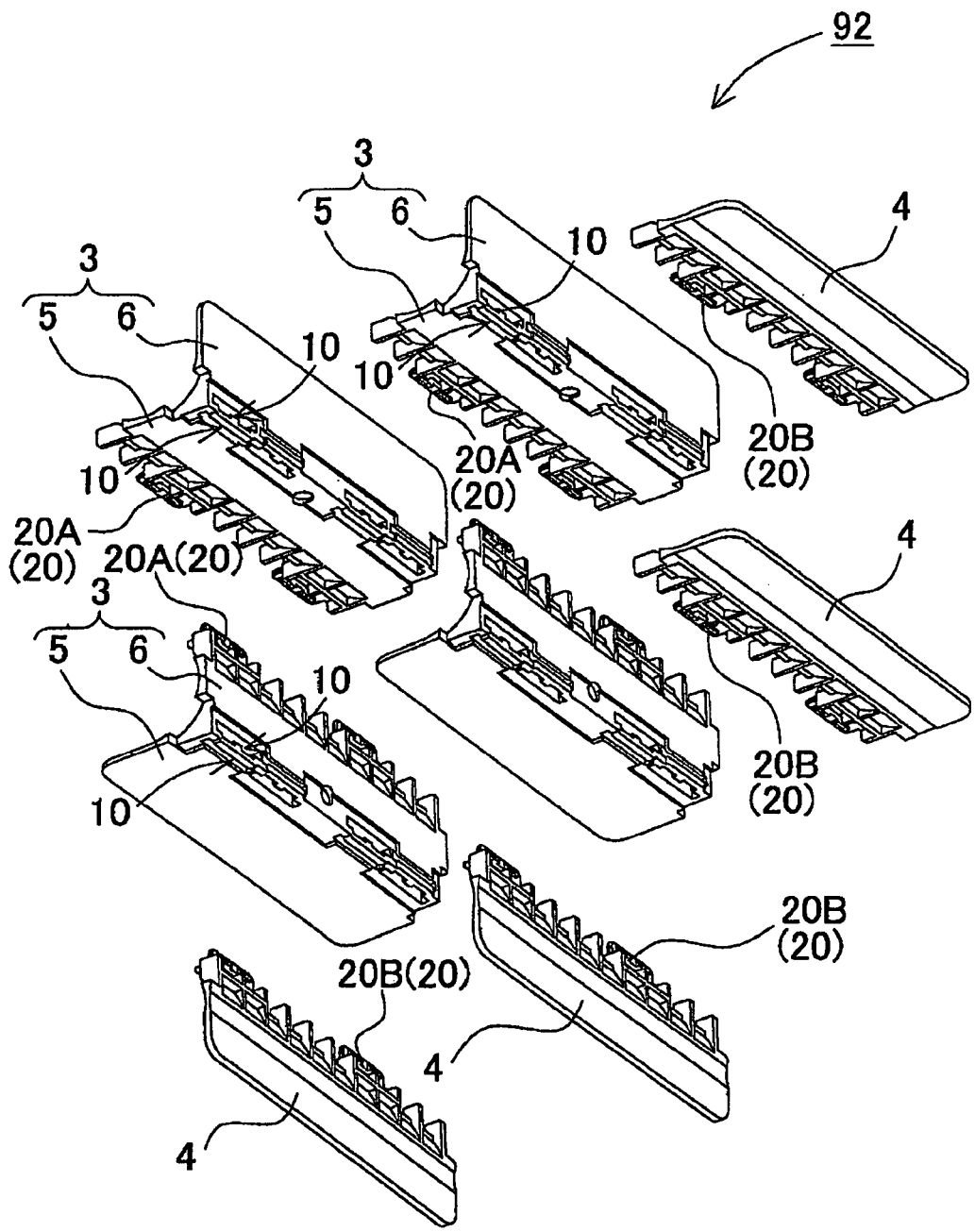
FIG. 17 is an exploded perspective view of the battery holder for the battery array shown in FIG. 16.

The battery array of FIG. 16 has nine batteries 1 disposed in three rows and three columns in a battery holder 92. As shown in FIG. 17, the battery holder 92 of this battery array is made of four L-shaped holders 3 and four flat-plate holders 4 to hold nine batteries 1 in three rows and three columns. This battery holder 92 has four L-shaped holders 3 connected in two rows and two columns and flat-plate holders 4 connected in all remaining connecting holes 10 of each L-shaped holder 3. The upper row of L-shaped holders 3 has first plates 5 disposed in a common horizontal plane, while the lower row of L-shaped holders 3 has first plates 5 disposed in vertical planes to connect the four L-shaped holders 3 in two rows and two columns. Although L-shaped holders 3 on the left and right sides of the lower row are not directly connected together, they are linked via the upper row of L-shaped holders 3. In addition, L-shaped holders 3 on the left and right sides of the lower row are connected together by the battery 1 disposed between them, which is attached to the plates via double-sided adhesive tape (not illustrated). Flat-plate holders 4 are connected in connecting holes 10 of the second plates 6 of L-shaped holders 3 in the lower row and in the remaining connecting holes 10 of L-shaped holders 3 on the right side of both rows.

Although not illustrated, the four L-shaped holders can also be connected in two rows and two columns in a different configuration. The upper row of two L-shaped holders can be connected with first plates disposed in a common horizontal plane. The lower row L-shaped holder on the left side can have its first plate connected in connecting holes of the upper row L-shaped holder on the left side. Meanwhile the lower row L-shaped holder on the right side can have its first plate connected in first plate connecting holes of the lower row L-shaped holder on the left side. In this battery holder, upper and lower L-shaped holders in the column on the right side are not directly connected together, but they are linked via the column of L-shaped holders 3 on the left side.

The battery array described above has nine batteries 1 disposed in three rows and three columns in the battery holder 92. This battery array can also be assembled in the same manner as the battery array shown in FIGS. 2-4. Specifically, batteries 1 can be arranged in specified positions in the battery holder 92 to form the battery assembly 99, and the battery assembly 99 can be covered with heat-shrink tubing or inserted in an external case to assemble the battery array. Further, the number of L-shaped holders 3 connected horizontally and vertically can be increased to hold many batteries 1 in a battery holder with three or more rows and three or more columns. In this battery holder, L-shaped holders 3 disposed in lower rows are indirectly connected on the left and right via L-shaped holders 3 in the upper row. Therefore, all L-shaped holders are reliably held in fixed positions by inserting the battery assembly 99 in heat-shrink tubing or an external case.

Figure 18:
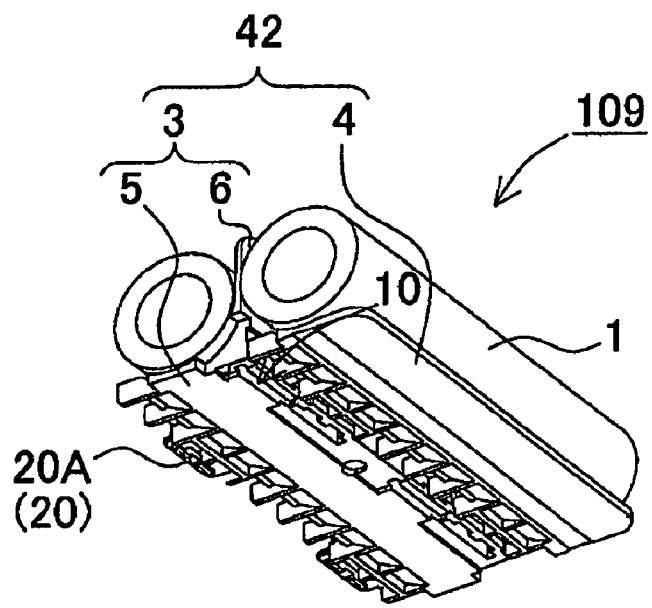
FIG. 18 is a perspective view from below of a battery array constructed in accordance with a seventh embodiment of the present invention.
Figure 19:
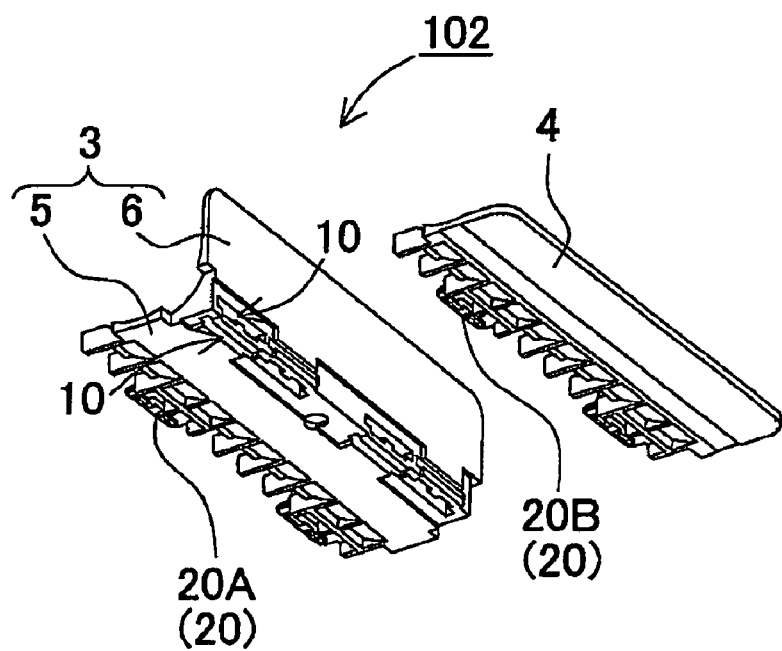
FIG. 19 is an exploded perspective view of the battery holder for the battery array shown in FIG. 18.

The battery array of FIG. 18 has two batteries 1 disposed in one row with two columns in a battery holder 102. As shown in FIG. 19, the battery holder 102 of this battery array is made of one flat-plate holder 4 connected to one L-shaped holder 3 to hold two batteries 1. This battery holder 102 has a flat-plate holder 4 connected in connecting holes 10 of the first plate 5 or the second plate 6 of the L-shaped holder 3 to hold batteries 1 in one row with two columns. This battery array can be assembled in the same manner as the battery array shown in FIGS. 8-10. Specifically, batteries 1 can be arranged in specified positions in the battery holder 102 to form the battery assembly 109, and the battery assembly 109 can be covered with heat-shrink tubing or inserted in an external case to assemble the battery array.

Figure 25A:
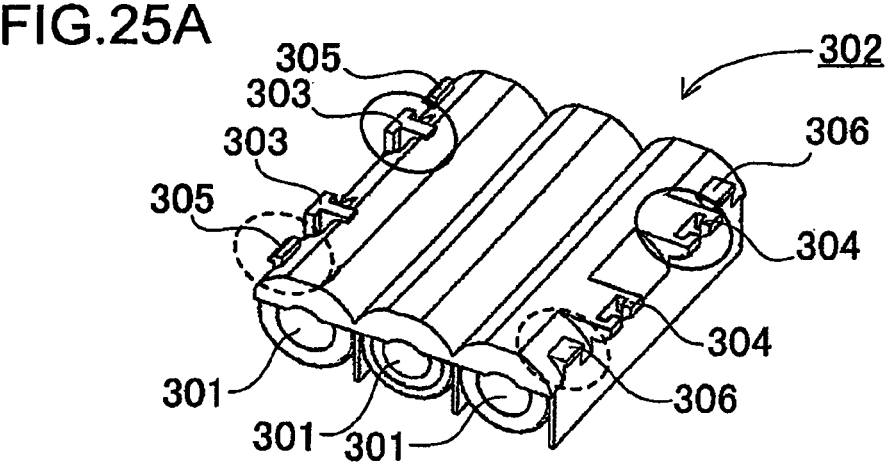
FIGS. 25A-C are perspective views showing an example of a variation of the battery holder.
Figure 25B:
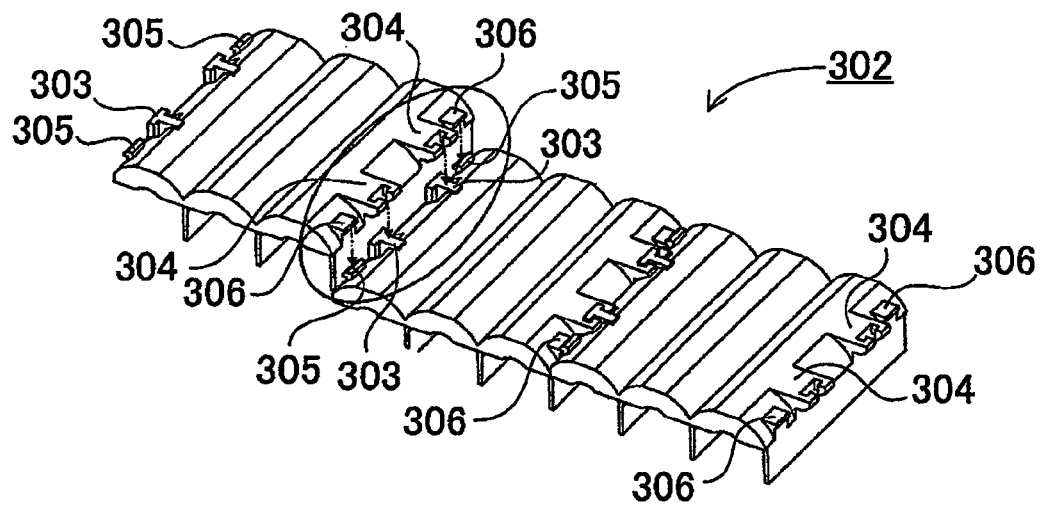
Figure 25C:
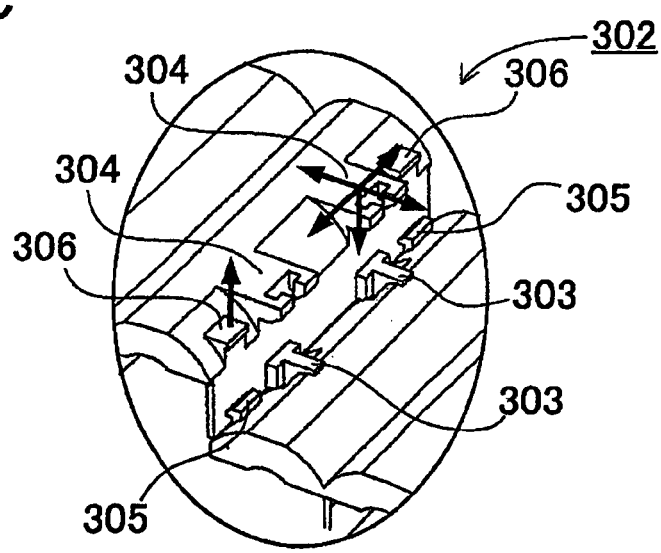

Finally, a battery holder structure as shown in FIGS. 25 A-C can also be adopted. FIG. 25A shows a perspective view of an example of a variation of the battery holder, FIG. 25B shows a perspective view of connected battery holders, and FIG. 25C shows an enlarged view of the connecting structure circled in FIG. 25B. Individual battery holders 302 shown in these figures each have a shape that can hold three batteries 301 side by side. Further, a battery holder 302 is asymmetric left-to-right with connecting structures established on the left and right sides to interconnect battery holders 302. Specifically, as shown in the solid circles of FIG. 25A, T-shaped connectors 303 are provided on one side, and T-shaped slots 304, which allow T-shaped connector insertion, are established on the other side. As shown in FIG. 25B, battery holders 302 can be arranged side by side and connected by inserting T-shaped connectors 303 in opposing T-shaped slots 304. In particular, since T-shaped connector 303 forward-aft and left-right movements are restricted by mating with T-shaped slots 304, there is a positive effect on battery holder 302 position alignment. In the example of FIGS. 25 A-C, two T-shaped connectors 303 are provided on the left side of a battery holder 302 at locations approximately one third of the length in both directions, and two T-shaped slots 304 are provided at corresponding locations on the right side of the battery holder 302.

Position alignment in the vertical direction can also be included. In the illustrated example, T-shaped connectors 303 are established projecting outward from the inclined surface of a battery holder 302. The upper surface of a T-shaped connector 303 is essentially in a horizontal plane and the thickness of the T-shaped connector 303 increases from the top of the battery holder 302 to the outer edge of the T-shaped connector 303 to form a triangular lateral cross-section. Correspondingly, a T-shaped slot 304 has a bottom surface that forms a complementary triangular cross section that becomes thinner towards the outer edge. With this arrangement, as shown in FIG. 25B, T-shaped connectors 303 are inserted from above into T-shaped slots 304 until the bottom surfaces of T-shaped slots 304 contact the inclined surfaces of battery holder 302. In this configuration, downward movement shown in FIG. 25C is restricted.

Meanwhile, as shown by the broken-line circles in FIG. 25A, separate locking hooks 305 and corresponding locking shelves 306 are established next to T-shaped connectors 303 and T-shaped slots 304 respectively. A locking hook 305 has an outward protruding hook-shape that locks with the outer edge of a locking shelf 306. The outer edge of a locking shelf 306 is also formed as a slightly outward protruding edge, while the upper surface of the outer edge of a locking hook 305 is beveled to form an inclined surface. Further, the battery holder 302 is constructed of a pliable material such as plastic that allows elastic deformation. As shown in the left side of FIG. 25B, when T-shaped slots 304 are pressed down to insert into T-shaped connectors 303, protruding edges of the locking shelves 306 press against inclined surfaces on outer edges of the locking hooks 305. Elastic deformation allows the protruding edges of the locking shelves 306 to lock under the bottom surfaces of the locking hooks 305. As shown in the right side of FIG. 25B, upper surfaces of the locking shelves 306 are in contact with bottom surfaces of the locking hooks 305 in the locked configuration. As shown in FIG. 25C, this restrains upward movement of the locking shelf side of a battery holder 302. In this manner, upward movement of battery holder 302 is restrained by locking hooks 305 and locking shelves 306, downward movement is restrained by T-shaped connectors 303 and T-shaped slots 304, and battery holder alignment in the vertical direction is achieved by their combination. Consequently, battery holder 302 alignment shift in the vertical direction, and in the horizontal direction is restrained by virtue of the battery holder connecting structure, and stable connection that maintains alignment is achieved.

It should be apparent to those of ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the spirit and scope of the invention as defined in the appended claims.

What is claimed is:

1. A battery holder for a battery array that disposes plates between batteries arranged in parallel orientation and holds batteries in specified positions, the battery holder comprising:
    at least one L-shaped holder having a first plate and a second plate, connected at a perpendicular corner region and having an L-shaped lateral cross-section; and
    at least one flat-plate holder that connects with the L-shaped holder and has an overall planar form;
    wherein the first plate and the second plate of the L-shaped holder have at least one connecting hole at an outside of the corner region;
    wherein the first plate is provided with at least one first connecting tab at an outer edge opposite the corner region connecting the second plate, and the L-shaped holder is configured so that the first connecting tab can connect with a connecting hole formed at an outside of a corner region of another L-shaped holder; and
    wherein the flat-plate holder is provided with at least one second connecting tab on at least one side edge, and the second connecting tab is capable of connecting with the connecting hole of the L-shaped holder.

2. The battery holder as cited in claim 1, wherein the second connecting tab provided on the flat-plate holder is inserted into the connecting hole of the L-shaped holder to connect a plurality of plates in mutually orthogonal and parallel arrangements, and batteries are disposed between those plates.

3. The battery holder as cited in claim 2, wherein:
    the battery holder comprises a plurality of L-shaped holders;
    each of the L-shaped holders comprises a plurality of connecting holes; and
    a first connecting tab provided on another one of the L-shaped holders is inserted in the connecting hole of the L-shaped holder to connect a plurality of plates in mutually orthogonal and parallel arrangements, and batteries are disposed between those plates.

4. The battery holder as cited in claim 1, wherein at least one retaining rib is formed as a single piece with the L-shaped holder along the outer edge of the first plate that is provided with the first connecting tab, the retaining rib being configured to retain connected plates at a right angle.

5. The battery holder as cited in claim 1, wherein at least one retaining rib is formed as a single piece with the flat-plate holder along the side edge of the L-shaped holder that is provided with the second connecting tab, the retaining rib being configured to retain connected plates at a right angle.

6. The battery holder as cited in claim 1 wherein each of the first and second plates has a width and a length that is suitable for holding circular cylindrical batteries.

7. The battery holder as cited in claim 2, wherein:
the battery holder comprises a plurality of L-shaped holders;
each of the L-shaped holders comprises a plurality of connecting holes; and
a first connecting tab of another one of the L-shaped holders is inserted into the connecting hole provided in the second plate of the L-shaped holder to connect a plurality of L-shaped holders in multiple columns and dispose holder plates in multiple columns between batteries.

8. The battery holder as cited in claim 7, wherein:
the battery holder comprises a plurality of flat-plate holders; and
at least one second connecting tab of another one of the flat-plate holders is inserted into the connecting hole of the L-shaped holder to connect flat-plate holders and L-shaped holders and establish arrays of multiple rows and columns with holder plates disposed between batteries.

9. The battery holder as cited in claim 1, wherein:
the battery holder comprises a plurality of L-shaped holders;
the L-shaped holder comprises a plurality of connecting holes; and
a first connecting tab of another one of the L-shaped holders is inserted into the connecting hole provided in the second plate of the L-shaped holder to connect the plurality of L-shaped holders in multiple columns;
a first connecting tab of the another one L-shaped holder is inserted into another connecting hole provided in the first plate of the L-shaped holder to connect the plurality of L-shaped holders connected in columns in a plurality of rows;
further, the second connecting tab provided on the flat-plate holder is inserted into another connecting hole of the L-shaped holder to dispose plates of the flat-plate holder and the L-shaped holder in common planes and establish arrays of multiple rows and columns with holder plates disposed between batteries.

10. The battery holder as cited in claim 1, wherein the second connecting tab provided on the flat-plate holder is inserted into the connecting hole provided in the second plate of the L-shaped holder to dispose a plate of the flat-plate holder and the first plate of the L-shaped holder in common planes and dispose holder plates between batteries.

11. A battery array comprising:
a plurality of batteries that can be recharged and are arranged in parallel orientation;
a battery holder that disposes plates between the batteries and holds the batteries in specified positions;
wherein the battery holder further comprises:
at least one L-shaped holder having a first plate and a second plate, connected at a perpendicular corner region and having an L-shaped lateral cross-section; and
at least one flat-plate holder that connects with the L-shaped holder and has an overall planar form;
the first plate and the second plate of the L-shaped holder have at least one connecting hole at an outside of the corner region;
the first plate is provided with at least one first connecting tab at a side edge opposite the corner region, and the L-shaped holder is configured so that the first connecting tab can connect with a connecting hole formed at an outside of a corner region of another L-shaped holder; and
the flat-plate holder is provided with at least one second connecting tab on at least one side edge, and the second connecting tab is capable of connecting with the connecting hole of the L-shaped holder.

12. The battery array as cited in claim 11, wherein the second connecting tab provided on the flat-plate holder is inserted into the connecting hole of the L-shaped holder to connect a plurality of plates in mutually orthogonal and parallel arrangements, and batteries are disposed between those plates.

13. The battery array as cited in claim 12, wherein:
the battery holder comprises a plurality of L-shaped holders;
each of the L-shaped holders comprises a plurality of connecting holes; and
a first connecting tab provided on another one of the L-shaped holders connects to the connecting hole of the L-shaped holder to connect a plurality of plates in mutually orthogonal and parallel arrangements, and batteries are disposed between those plates.

14. The battery array as cited in claim 11, wherein at least one retaining rib, which retains connected plates at a right angle is formed as a single piece with the L-shaped holder along the outer edge of the first plate that is provided with the first connecting tab.

15. The battery array as cited in claim 11, wherein at least one retaining rib, which retains connected plates at a right angle, is formed as a single piece with the flat-plate holder along the side edge of the L-shaped holder that is provided with the second connecting tab.

16. The battery array as cited in claim 11, wherein each of the first and second plates has a width and a length that is suitable for holding circular cylindrical batteries.

17. The battery array as cited in claim 12, wherein:
the battery holder comprises a plurality of L-shaped holders;
each of the L-shaped holders comprises a plurality of connecting holes; and
a first connecting tab of another one of the L-shaped holders is inserted into the connecting hole provided in the second plate of the L-shaped holder to connect the plurality of L-shaped holders in multiple columns and dispose holder plates in multiple columns between batteries.

18. The battery array as cited in claim 17, wherein:
the battery holder comprises a plurality of flat holders; and
at least one second connecting tab of another one of the flat-plate holders is inserted into the connecting hole provided in the L-shaped holder to connect the flat-plate holders and the L-shaped holders and establish arrays of multiple rows and columns with holder plates disposed between batteries.

19. The battery array as cited in claim 11, wherein:
the battery holder comprises a plurality of L-shaped holders;
each of the L-shaped holders comprises a plurality of connecting holes; and
a first connecting tab of another one of the L-shaped holders is inserted into the connecting hole provided in the second plate of the L-shaped holder to connect the plurality of L-shaped holders in multiple columns;

a first connecting tab of another L-shaped holder is inserted into another connecting hole provided in the first plate of the L-shaped holder to connect the plurality of L-shaped holders connected in columns in a plurality of rows;

further, the second connecting tab provided on the flat-plate holder is inserted into another connecting hole of the L-shaped holder to dispose plates of the flat-plate holder and the L-shaped holder in common planes and establish arrays of multiple rows and columns with holder plates disposed between batteries.

20. The battery array as cited in claim 11, wherein the second connecting tab provided on the flat-plate holder is inserted into the connecting hole provided in the second plate of the L-shaped holder to dispose the flat-plate holder and the first plate of the L-shaped holder in common planes and dispose holder plates between batteries.

* * * * *